(12) United States Patent
Petach et al.

(10) Patent No.: US 6,281,607 B1
(45) Date of Patent: Aug. 28, 2001

(54) ELECTRIC MOTOR WITH VIBRATION ATTENUATION

(75) Inventors: Michael B. Petach, Redondo Beach; Michael A. Jones; George M. Harpole, both of Torrance, all of CA (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/286,810

(22) Filed: Apr. 6, 1999

(51) Int. Cl.[7] .............................. H02K 5/24; H02K 1/12; F16F 1/10
(52) U.S. Cl. ............................. 310/51; 310/258; 267/156
(58) Field of Search .......................... 310/51, 254, 258, 310/259, 91, 71; 76/574; 336/100; 248/560, 587, 608; 267/155, 156, 180, 182, 275; 417/363, 423.15, 424.2

(56) References Cited

U.S. PATENT DOCUMENTS

| | | | |
|---|---|---|---|
| 1,477,773 | * 12/1923 | Schou et al. | 310/258 |
| 1,611,942 | * 12/1926 | Persons | 310/258 |
| 2,460,063 | * 1/1949 | Cole | 310/258 |
| 2,465,275 | * 3/1949 | Rushing et al. | 310/258 |
| 2,632,861 | 3/1953 | Morton et al. | 310/351 |
| 3,226,579 | 12/1965 | Bygdnes | 310/51 |
| 3,812,392 | * 5/1974 | Barton et al. | 310/259 |
| 4,082,974 | 4/1978 | Yamamoto et al. | 310/179 |
| 4,395,205 | * 7/1983 | McCullough | 418/55 |
| 4,434,382 | * 2/1984 | Patel et al. | 310/51 |
| 4,587,722 | * 5/1986 | Miller | 29/596 |
| 4,602,176 | * 7/1986 | Baker | 310/51 |
| 4,998,865 | * 3/1991 | Nakanishi et al. | 417/423.7 |
| 5,235,227 | 8/1993 | Fazekas | 310/51 |
| 5,315,200 | 5/1994 | Lemieux et al. | 310/258 |
| 5,461,268 | 10/1995 | Sanada | 310/51 |
| 5,521,447 | 5/1996 | Bertolini et al. | 310/51 |
| 5,558,317 | * 9/1996 | Nels | 267/156 |
| 5,576,584 | 11/1996 | Kusumoto et al. | 310/45 |
| 5,612,583 | 3/1997 | Crucq et al. | 310/90 |
| 5,619,389 | 4/1997 | Dunfield et al. | 360/98.07 |
| 5,767,602 | * 6/1998 | Sargeant | 310/258 |
| 5,783,892 | * 7/1998 | Kanzaki et al. | 310/258 |
| 5,810,568 | * 9/1998 | Whitefield et al. | 417/423.8 |
| 5,847,476 | * 12/1998 | Elsing et al. | 310/51 |
| 5,861,691 | * 1/1999 | Soh et al. | 310/51 |

* cited by examiner

Primary Examiner—Elvin Enad
Assistant Examiner—Dang Dinh Le
(74) Attorney, Agent, or Firm—Tarolli, Sundheim, Covell, Tummino & Szabo L.L.P.

(57) ABSTRACT

An improved electric motor (34) includes a plurality of resiliently deflectable members (144, 146) which are disposed between a base (108) and a stator (100) to reduce transmission of vibration between the base and the stator. The resiliently deflectable members (144, 146) may be tubular spring pins which are disposed between the stator (100) and the base (108). Each of the tubular spring pins (144, 146) may have a cylindrical side wall (186) which defines a slot (184). During operation of the electric motor (34), vibration induced in the stator (100) causes the side walls (186) of the spring pins (144, 146) to resiliently deflect to attenuate the vibration. The stator (100) may be mounted on a tubular section (108) of the base. The spring pins (144, 146) may be disposed between the stator (100) and the tubular section (108) of the base. The tubular spring pins (144a) may be formed by rolled up sheet members (200).

98 Claims, 5 Drawing Sheets

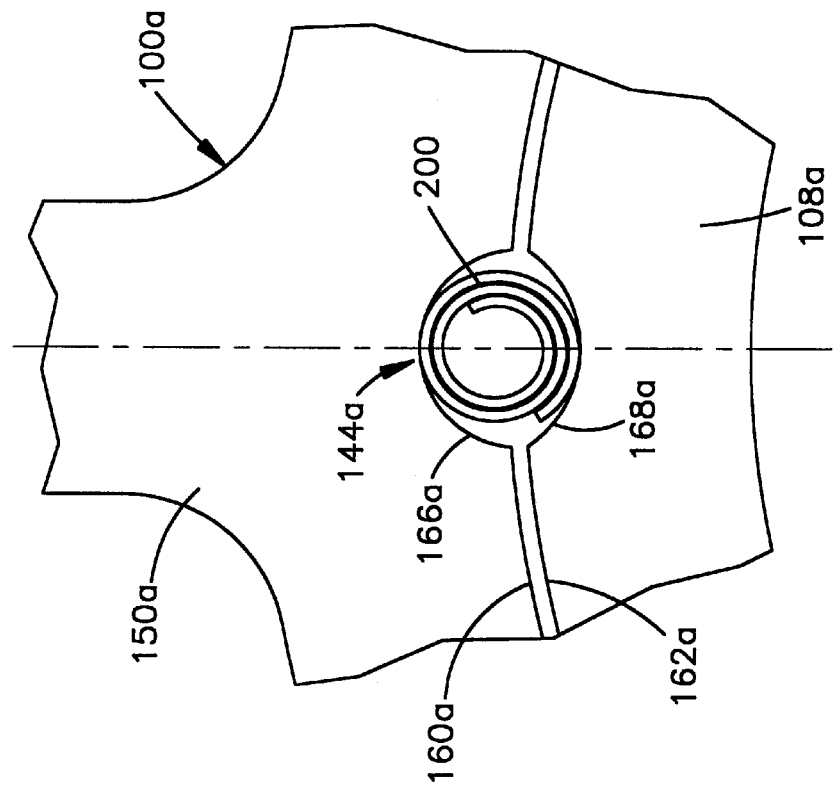
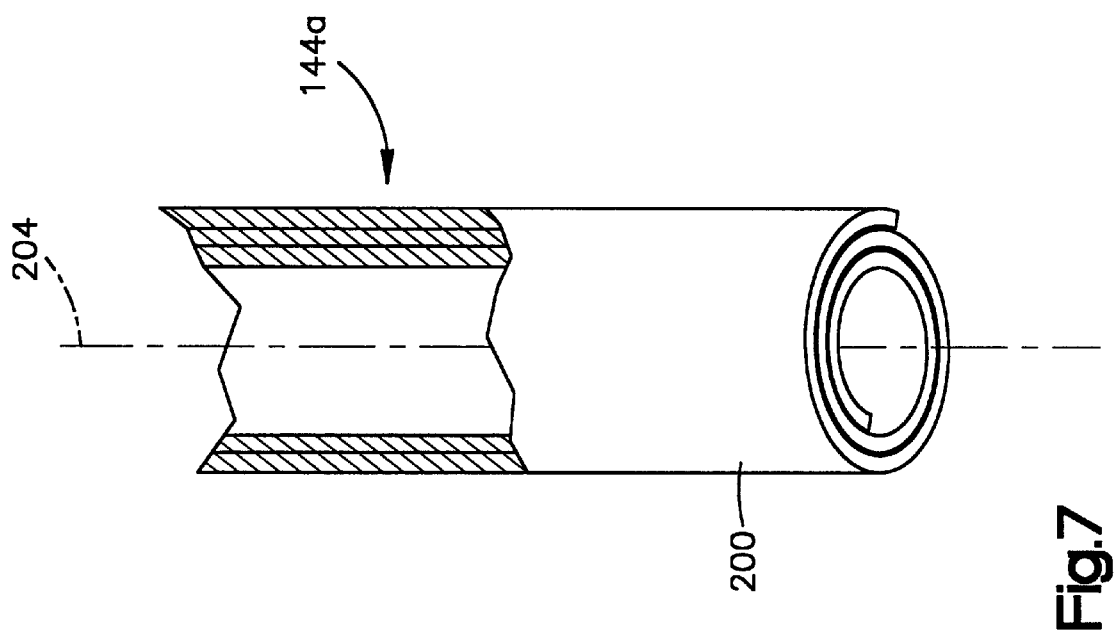

ELECTRIC MOTOR WITH VIBRATION ATTENUATION

BACKGROUND OF THE INVENTION

The present invention relates to an electric motor in which transmission of vibration between a stator and a base is attenuated.

A known electric motor includes a magnetic field assembly or stator which is enclosed by an armature assembly or rotor. A shaft is connected to the rotor and extends through the stator. O-rings are disposed between components of the stator to provide vibration isolation. An electric motor having this construction is illustrated in U.S. Pat. No. 5,235,227. Other known electric motors are disclosed in U.S. Pat. Nos. 4,082,974 and 5,315,200.

SUMMARY OF THE INVENTION

The present invention relates to an electric motor having a base and a stator connected with the base. A rotor is rotatable relative to the stator under the influence of magnetic forces transmitted between the rotor and stator. Resiliently deflectable members are disposed between the stator and the base to reduce transmission of vibration between the stator and the base. The resiliently deflectable members may be spring pins.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein:

FIG. 7 is an enlarged sectional view of a second embodiment of the spring pins; and FIG. 8 is a simplified schematic plan view, generally similar to FIG. 4, illustrating the relationship between a frame of a stator, a base, and a spring pin having the construction illustrated in FIG. 7.

DESCRIPTION OF SPECIFIC PREFERRED EMBODIMENTS OF THE INVENTION

General Description

Figure 1:
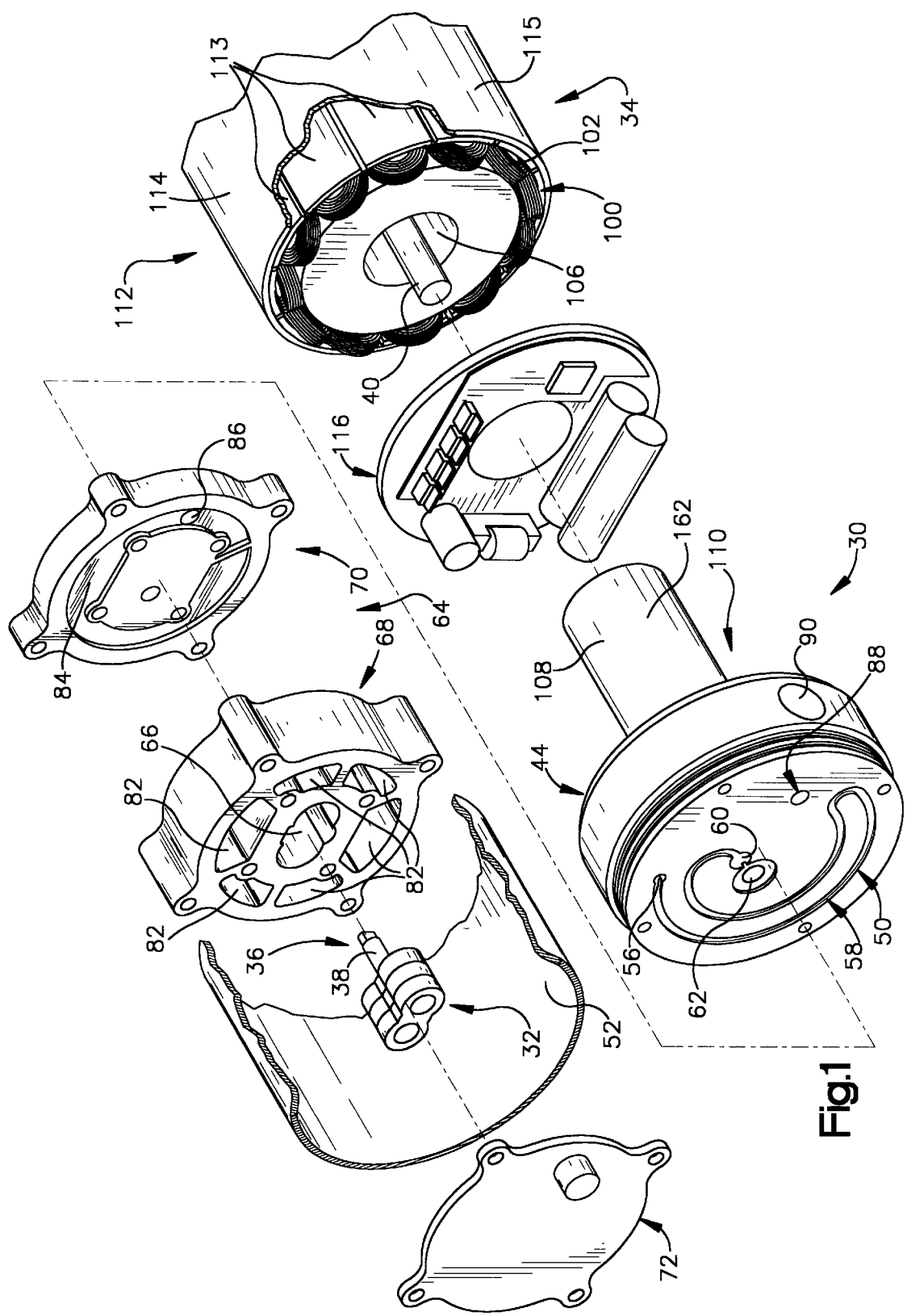
FIG. 1 is an exploded simplified schematic illustration of an apparatus which is utilized to pump hydraulic fluid.
Figure 2:
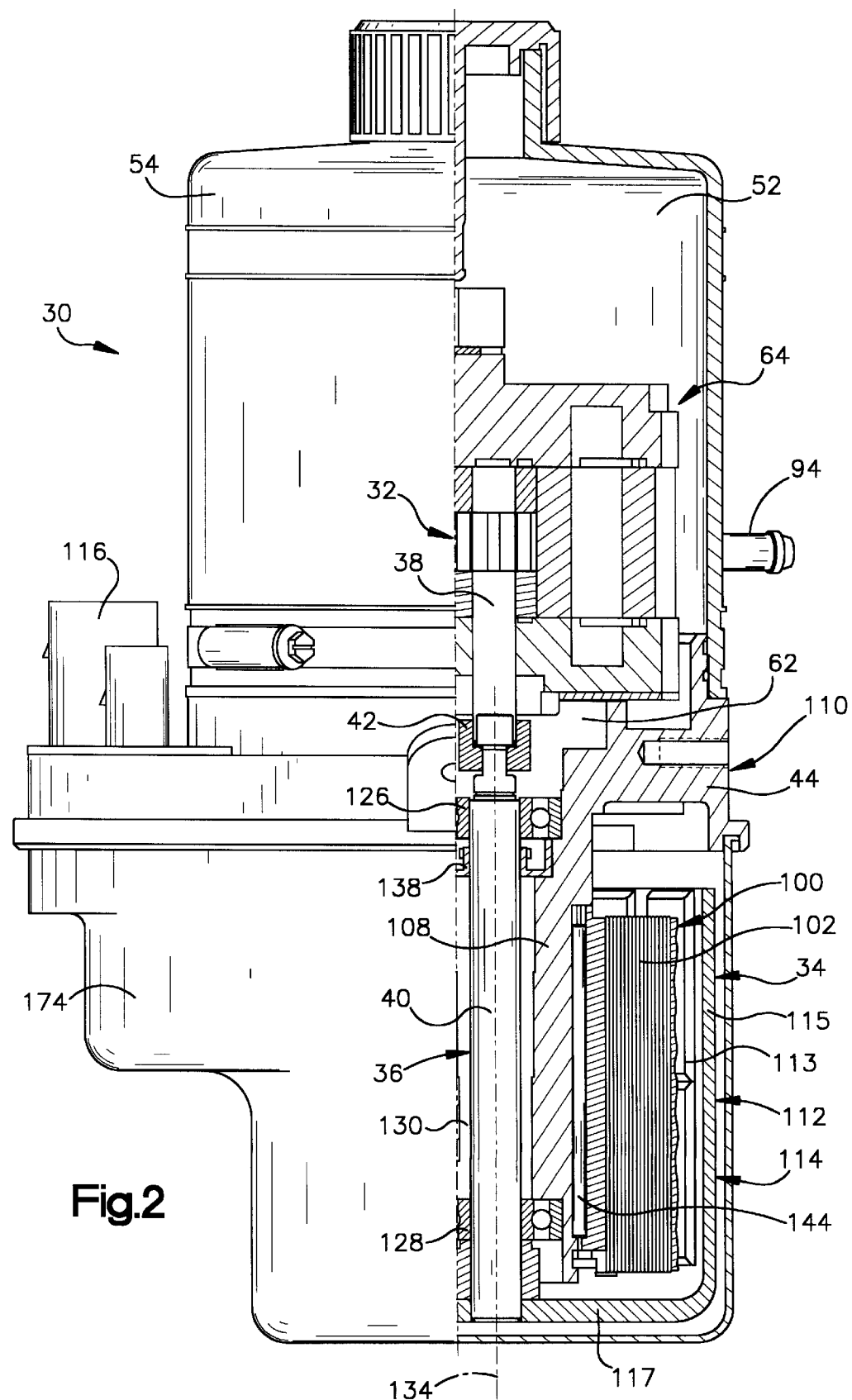
FIG. 2 is a partially broken away simplified view illustrating one specific embodiment of the apparatus of FIG. 1.

An apparatus 30 for use in pumping hydraulic fluid is illustrated schematically in FIG. 1. One specific preferred embodiment of the apparatus 30 is illustrated in FIG. 2. Although the apparatus 30 (FIGS. 1 and 2) may be used in many different environments, it is believed that the apparatus is particularly well suited to supplying power steering fluid to a hydraulically assisted rack and pinion steering gear. If the apparatus 30 is used in association with a rack and pinion steering gear, the apparatus provides fluid pressure to operate a power steering motor in response to actuation of a vehicle steering wheel. Operation of the power steering motor turns steerable vehicle wheels in a known manner.

The apparatus 30 includes a pump unit 32 which is driven by an electric motor 34 constructed in accordance with the present invention. A drive shaft 36 transmits rotational force (torque) from the electric motor 34 to the pump unit 32. The drive shaft 36 includes an input shaft 38 to the pump unit 32 and an output shaft 40 from the electric motor 34. The pump unit input shaft 38 and electric motor output shaft 40 are disposed in a coaxial relationship and are fixedly connected with each other by a connector 42 (FIG. 2).

A rigid metal manifold plate 44 (FIGS. 1 and 2) is disposed between and is connected to the pump unit 32 and the electric motor 34. The drive shaft 36 extends through the manifold plate 44. Hydraulic fluid is conducted to and from the pump unit 32 through the manifold plate 44.

Hydraulic Muffler

During operation of the pump unit 32 (FIGS. 1 and 2), hydraulic fluid pressure fluctuations produced by the pump unit result in the generation of noise. To attenuate the noise, a hydraulic muffler 50 (FIG. 1) may be provided between an inlet to the pump unit 32 and a reservoir 52 (FIGS. 1 and 2) which holds hydraulic fluid. The reservoir 52 is formed by a translucent polymeric housing 54 which is connected to the manifold plate 44 (FIG. 2). Hydraulic fluid in the reservoir 52 is exposed to an inlet end 56 of the hydraulic muffler 50.

The hydraulic muffler 50 includes a channel 58 formed in the manifold plate 44. The channel 58 has a serpentine configuration and conducts hydraulic fluid to an outlet end 60 of the hydraulic muffler 50. A flow of hydraulic fluid in the channel 50 is effective to attenuate noise produced by the pump unit 32.

The outlet end 60 (FIG. 1) of the hydraulic muffler 50 is disposed adjacent to and is connected in fluid communication with an opening 62 formed in the manifold plate 44. The input shaft 38 to the pump unit 32 extends into the opening 62 and is connected with the output shaft 40 from the electric motor 34 at the opening. The hydraulic fluid from the channel 58 flows from the opening 62 along the input shaft 38 of the pump unit 32 to an inlet opening to the pump unit 32.

The pump unit 32 is part of a pump assembly 64. The pump unit 32 is disposed in a pump chamber 66 (FIG. 1) formed in a rigid metal body section 68 of the pump assembly 64. One end of the body section 68 is closed by a rigid metal lower cover plate 70. The opposite end of the body section 68 is closed by a rigid metal upper cover plate 72.

During operation of the pump unit 32 in the pump chamber 66 of the body section 68, the pump unit induces hydraulic fluid to flow from the reservoir 52 to the inlet end 56 of the hydraulic muffler 50. The hydraulic fluid then flows along the channel 58 to the outlet end 60 of the hydraulic muffler 50 and the opening 62. The hydraulic fluid then flows along the drive shaft 36 through an inlet opening 76 in the lower cover plate 70. The hydraulic fluid flows from the inlet opening 76 into the pump chamber 66 and the inlet to the pump unit 32.

During operation of the pump unit 32, high-pressure fluid is directed from the pump chamber 66 toward the inner side of the upper cover plate 72. The high pressure fluid discharged from the pump unit 32 flows outward in a recess (not shown) formed in the inner side of the upper cover plate 72 to resonator passages 82 which extend axially through the body section 68 outside of the pump chamber 66. The high-pressure fluid from the resonator passages 82 is collected in a recess 84 formed in the inner side of the lower cover plate 70.

The high pressure fluid is conducted from the recess 84 through a single outlet passage 86 in the lower cover plate 70 to an outlet passage 88 formed in the manifold plate 44. The high-pressure fluid is conducted from the outlet passage 88 through an opening 90 formed in a cylindrical outer side 92 of the manifold plate 44. When the apparatus 30 is utilized in association with a power steering system for a vehicle, the high pressure fluid is conducted from the opening 90 through an outlet conduit 94 (FIG. 2) to a power steering control valve which is actuated in response to rotation of a vehicle steering wheel.

Electric Motor

The electric motor 34 (FIGS. 1 and 2) is operable to drive the pump unit 32. The electric motor 34 includes a stator 100 having a generally cylindrical configuration. The stator 100 includes a plurality of windings 102 disposed in an annular array about a longitudinal central axis of the stator. The stator 100 has a cylindrical central passage 106 (FIG. 1) which extends axially through the stator.

The stator 100 is mounted on a cylindrical tubular stem 108 which extends axially outward from the manifold plate 44 in a direction away from the pump unit 32. The tubular stem 108 forms a base of the electric motor 34. The stator 100 is telescopically received over the outside of the stem 108 and is connected to the stem. The stator 100 has a central axis which is coincident with the central axes of the tubular stem 108 and drive shaft 36.

The cylindrical tubular stem 108 and manifold plate 44 are integrally cast as one piece of metal and form a base 110. Although one specific base 110 has been illustrated in FIGS. 1 and 2, the base could have a different construction if desired.

A cylindrical rotor 112 extends around the outside of the stator 100. The rotor 112 encloses the stator 100. The cylindrical rotor 112 is disposed in a coaxial relationship with the stator 100 and the stem 108 which forms the base of the motor 34.

The rotor 112 includes a circular array of permanent magnets 113. The permanent magnets 113 are fixedly secured to a cylindrical housing 114. The housing 114 includes a cylindrical side wall 115 and circular end wall 117 (FIG. 2) to which the motor output shaft 40 is fixedly connected. The rotor 112 is rotatable about the central axis of the stator 100. The central axes of the rotor 112 and stator 100 are coincident with a longitudinal central axis of the tubular stem 108. The electric motor 34 is mounted on a side of the base 110 opposite from the pump unit 32.

The cylindrical motor output shaft 40 is fixedly connected with an axial end of the rotor 112 which is furthest from the manifold plate 44. The output shaft 40 extends axially through the cylindrical passage 106 in the stator 100 and through the stem 108 of the base 110. The motor output shaft 40 is connected to the pump input shaft 38 at the opening 62 in the manifold plate 44.

The motor output shaft 40 and rotor 112 are supported for rotation by a pair of bearings 126 and 128 (FIG. 2). The bearings 126 and 128 are disposed in a cylindrical passage 130 in the tubular stem 108, which forms the base of the motor 34. The bearings 126 and 128 rotatably support the motor output shaft 40 for rotation relative to the stator 100 about a central axis 134 of the tubular stem 108 and stator 100. The axis 134 is coincident with the central axes of the motor output shaft 40, tubular stem 108, stator 100 and rotor 112. A seal 138 blocks the upper portion of the passage 130.

Motor control circuitry 116 is mounted on a support plate 118. The motor control circuitry 116 is disposed between the manifold plate 44 and the stator 100. The motor control circuitry 116 controls the operation of the electric motor 34. Flexible connections are provided between the motor control circuitry 116 and the stator 100 to minimize vibrational forces transmitted to and through the motor control circuitry.

During operation of the apparatus 30 to supply fluid under pressure, the motor control circuitry 116 effects energization of the electric motor 34. This results in rotation of the rotor 112 and output shaft 40 about their coincident longitudinal central axes. This drives the pump unit 32 to provide hydraulic fluid under pressure.

The electric motor 34 is constructed so as to have a rotor 112 which encloses a stator 100 and at least a portion of the base of the motor, that is, the tubular stem 108. However, the electric motor 34 could be constructed so as to have a stator which encloses the rotor. Electric motors having stators which enclose a rotor are well known and may have a construction similar to the construction disclosed in U.S. Pat. Nos. 4,082,974 and/or 5,315,200.

In the illustrated embodiment of the invention, the base 110 is cast as one piece of metal. It is contemplated that the base 110 could be formed of a plurality of pieces which are fixedly interconnected. For example, the manifold plate 44 and tubular stem 108 could be formed separately from each other and then fixedly interconnected.

The illustrated base 110 includes the manifold plate 44 through which fluid is conducted during operation of the pump unit 32. However, the base 110 could be constructed as a solid block, with or without an extension corresponding to the tubular stem 108. If desired, the motor 34 could be constructed with a base other than the tubular stem 108. Although it is preferred to use the motor 34 to drive the pump unit 32, the motor 34 could be used to drive other known devices if desired.

The apparatus 30 has the same general construction as disclosed in U.S. patent application Ser. No. 09/198,126 filed Nov. 23, 1998 by George Harpole et al. for "Pump Having Muffler for Attenuating Noise" (Project 5215). However, it should be understood that the apparatus 30 could have a different construction and could be used for many different purposes if desired.

Vibration Isolation

In accordance with a feature of the present invention, a plurality of resiliently deflectable members 144 and 146 (FIGS. 3 and 4) are provided between the stator 100 and the tubular stem 108 of the base 110. During operation of the electric motor 34 (FIGS. 2 and 3), torque ripple at the interface between the rotor 112 and stator 100 causes vibrations to be induced in the stator. In the absence of the resiliently deflectable members 144 and 146, vibrations are transmitted through the base 110 to the housing 54 which forms a reservoir 52 and encloses the pump assembly 64.

Vibration of the base 110 and/or housing 54 results in objectionable noise. If the electric motor 34 is associated with an apparatus other than the pump assembly 64 and housing 54, it is believed that the vibrations induced in the base may still be objectionable. The resiliently deflectable members 144 and 146 reduce the transmission of vibration from the stator 100 to the base of the motor 34 to thereby minimize objectionable noise during operation of the electric motor.

Figure 4:
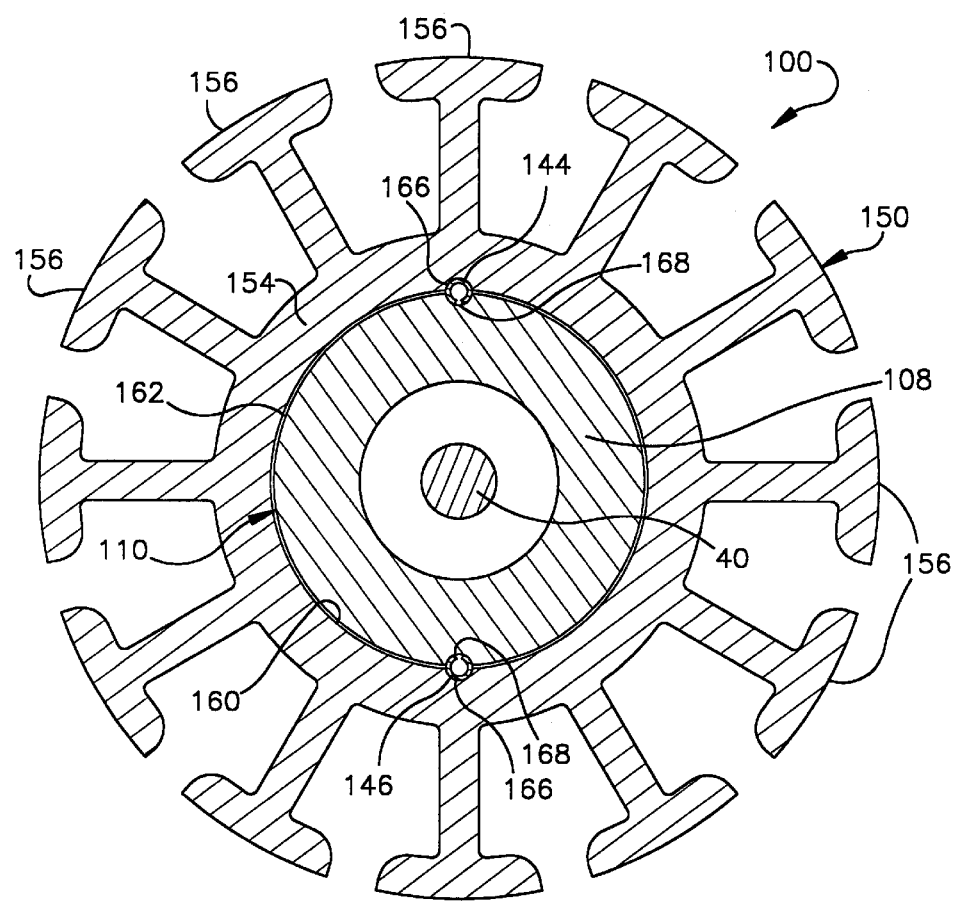
FIG. 4 is a simplified schematic plan view, taken generally along the line 4—4 of FIG. 3, illustrating the relationship between a frame of the stator, a base, and a plurality of spring pins.

In the embodiment of the invention illustrated in FIG. 4, the resiliently deflectable members 144 and 146 are disposed between a rigid metal frame 150 of the stator 100 and the tubular stem 108 which forms the base of the electric motor 34. If desired, the electric motor 34 could have a base other than the tubular stem 108. It should be understood that the windings 102 have been omitted in FIG. 4 to clearly illustrate the relationship between the resiliently deflectable members 144 and 146 and the tubular stem 108.

The frame 150 has a cylindrical central portion 154 which extends around the tubular stem 108 and has a central axis which is coincident with the central axes of the tubular stem 108 and the motor output shaft 40. A plurality of arms 156 extend radially outward from the central portion 154 of the frame 150. The arms 156 extend axially throughout the length of the stator 100. Although the windings 102 (FIGS. 1 and 3) have been omitted from FIG. 4, it should be understood that a winding 102 is provided around each of the arms 156 of the stator frame 150. The stator frame 150 is integrally formed as a single piece of metal.

The resiliently deflectable members 144 and 146 are disposed between a cylindrical inner side surface 160 on the central portion 154 of the stator frame 150 and a cylindrical outer side surface 162 of the tubular stem 108. The resiliently deflectable members 144 and 146 are disposed in parallel axially extending linear grooves 166 formed in the central portion 154 of the stator frame 150. In addition, the resiliently deflectable members 144 and 146 are disposed in parallel axially extending linear grooves 168 formed in the tubular stem 108.

Figure 3:
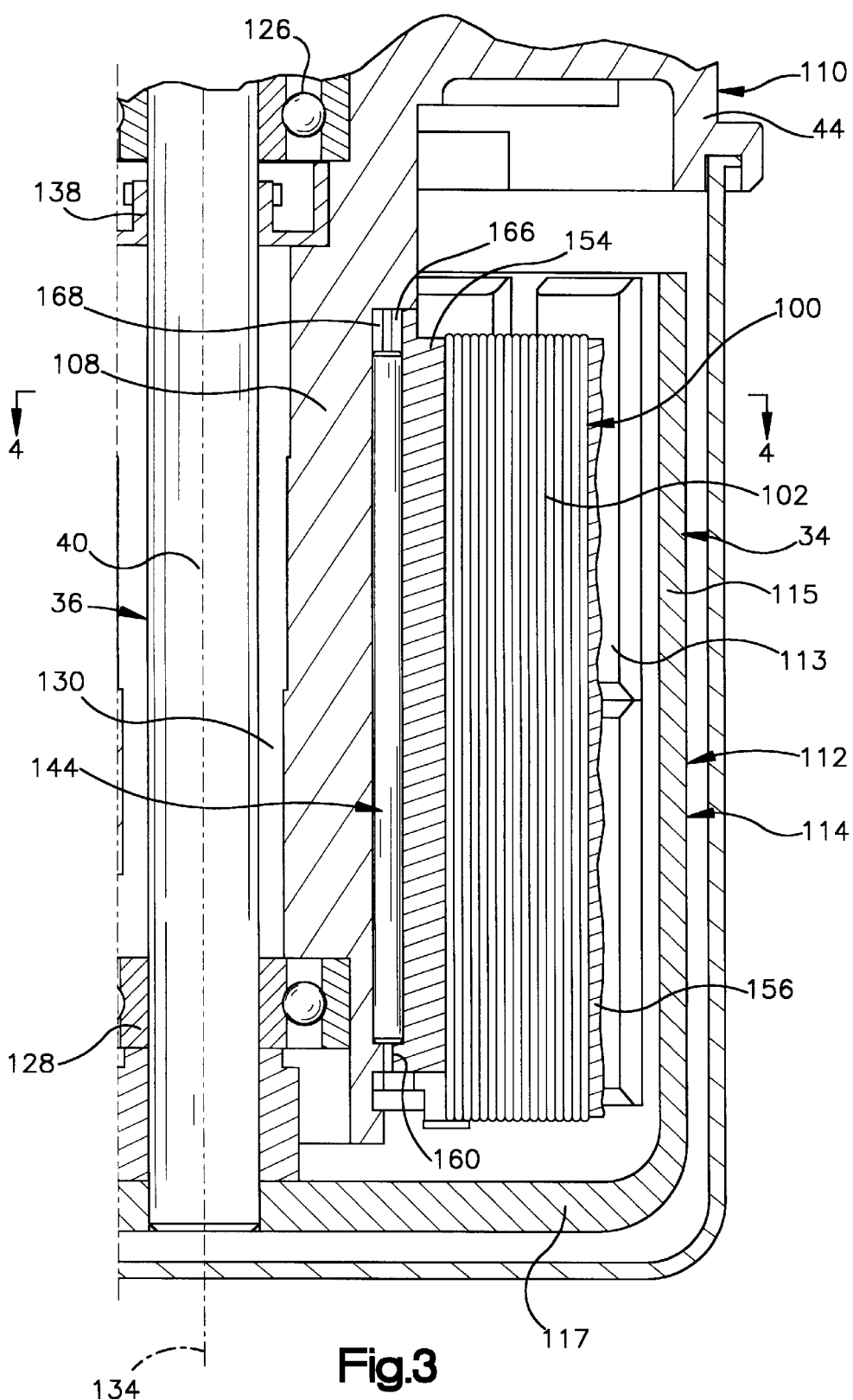
FIG. 3 is a simplified enlarged fragmentary sectional view of a portion of FIG. 1 and illustrating the manner in which a spring pin is disposed between a stator and base of an electric motor constructed in accordance with the present invention.

The grooves 166 in the stator frame 150 have side surfaces with centers of curvature which are located radially inward from the cylindrical inner side surface 160 of the stator frame. Each of the grooves 166 is formed as a segment of a cylinder and has an arcuate extent of less than 180°. Similarly, the grooves 168 in the tubular stem 108 have side surfaces with centers of curvature which are disposed radially outward from the cylindrical outer side surface 162 of the tubular stem. Each of the grooves 168 is formed as a segment of a cylinder and has an arcuate extent of less than 180°. The linear grooves 166 and 168 have longitudinal central axes which extend parallel to the longitudinal central axis 134 of the motor output shaft 40 (FIG. 3).

The resiliently deflectable members 144 and 146 are disposed in the grooves 166 and 168 in the stator frame 150 and tubular stem 108. The resiliently deflectable members 144 and 146 have a linear configuration corresponding to the linear configuration of the grooves 166 and 168. The resiliently deflectable members 144 and 146 have longitudinal central axes which extend parallel to the coincident longitudinal central axis of the central portion 154 of the stator frame 150 and the longitudinal central axis of the tubular stem 108. The central axes of the resiliently deflectable members 144 and 146 are disposed in a plane which contains the longitudinal central axis of the tubular stem 108.

During operation of the electric motor 34, vibration forces which extend tangentially and radially to the cylindrical inner side surface 160 of the stator frame 150 are isolated by the resiliently deflectable members 144 and 146. Therefore, greatly reduced vibrational forces are transmitted between the stator frame 150 and tubular stem 108 which forms the base for the electric motor 34.

The resiliently deflectable members 144 and 146 reduce the effective transmission frequency of the structure formed by the stator frame 150 and the tubular stem 108 by more than a factor of ten over a structure formed by the stator frame 150 fixedly connected with the tubular stem by a rigid key and slot connection. By reducing the vibrational force transmitted between the stator frame 150 and the tubular stem 108 during operation of the electric motor 34, vibration of the manifold plate 44 and housing 54 which forms the reservoir 52 (FIG. 2) tends to be minimized. Vibration of a sheet metal housing 174 (FIG. 2) which is connected with the manifold plate 44 and encloses the electric motor 34 is also minimized. By minimizing vibration of the manifold plate 44 and the housings 54 and 174, there is a substantial reduction in the amount of objectionable noise during operation of the electric motor 34.

In the embodiment of the invention illustrated in FIGS. 1–4, the rotor 112 encloses the stator 100 and the tubular stem 108 which forms the base for the electric motor. However, it is contemplated that the electric motor could be constructed in such a manner as to have the stator enclose the rotor. If this was done, the resiliently deflectable members 144 and 146 would be provided between a portion of the stator which is adjacent to a base of the electric motor.

In the illustrated embodiment of the invention, the resiliently deflectable members 144 and 146 extend axially throughout substantially the entire length (FIG. 3) of the stator 100. However, with a different motor construction, the resiliently deflectable members 144 and 146 could extend through relatively short distances at axially opposite ends of the stator 100. The resiliently deflectable members 144 and 146, with a different construction of the electric motor 34, could be disposed between an outer surface of the stator 100 and a base for the electric motor.

In accordance with another feature of the present invention, the resiliently deflectable members 144 and 146 hollow are tubular spring pins. The tubular spring pins 144 and 146 are identical. The tubular spring pin 144 has a generally cylindrical configuration (FIGS. 5 and 6).

Figures 5, 6:
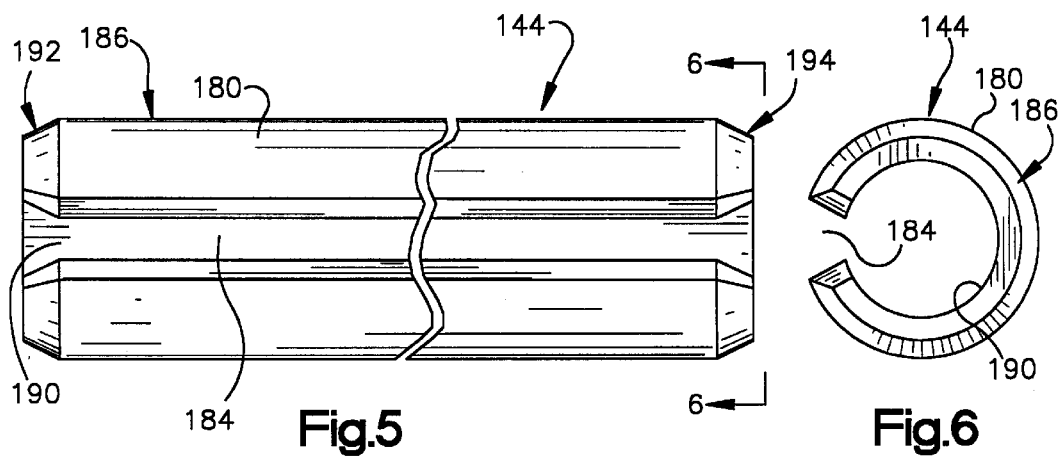
FIG. 5 is an enlarged fragmentary view of one of the spring pins of FIG. 4.
FIG. 6 is an end view, taken generally along the line 6—6 of FIG. 5, further illustrating the construction of the spring pin.

The tubular spring pin 144 has a cylindrical outer side surface 180 (FIGS. 5 and 6). The cylindrical outer side surface 180 of the spring pin 144 has a radius of curvature which is slightly less than the radius of curvature of the groove 166 formed in the stator frame 150. Similarly, the radius of curvature of the outer side surface 180 of the spring pin 144 is smaller than the radius of curvature of the groove 168 in the tubular stem 108. When inserted into the grooves 166 and 168, the spring pin 144 has a cylindrical outer side surface 180 with a radius of curvature which is less than the radius of curvature of the grooves 166 and 168, such that there is line contact between the spring pin 144 and the surfaces of the grooves 166 and 168. This enables the spring pin 144 to be freely deflected by forces which extend radially and tangentially to the outer side surface 180 of the spring pin 144.

To accommodate resilient deflection of the spring pin 144, a longitudinally extending linear slot 184 (FIGS. 5 and 6) is formed in a cylindrical side wall 186 of the spring pin 144. The outer side surface 180 of the spring pin 144 extends between opposite longitudinally extending sides of the slot 184. In the illustrated embodiment of the invention, the tubular spring pin 144 is hollow and has an inner side surface 190 with a center of curvature which is coincident with the center of curvature of the outer side surface 180 of the spring pin. Opposite end portions 192 and 194 (FIG. 5) of the spring pin 144 are axially tapered to facilitate insertion of the spring pin into the grooves 166 and 168.

When the spring pin 144 is in a relaxed condition, that is, when the spring pin is unrestrained, the cylindrical outer side surface 180 of the spring pin has a diameter which is greater than the maximum distance between the surfaces of the grooves 166 and 168 in the stator frame 150 and tubular stem 108. Therefore, when the spring pin 144 is inserted into the longitudinally extending opening formed by cooperation between the two grooves 166 and 168, the spring pin 144 is resiliently compressed. However, the extent of resilient compression of the spring pin 144 is relatively small and is not great enough to close the slot 184.

As a leading end portion 192 or 194 of the spring pin 144 is forced into the longitudinally extending opening formed by the two grooves 166 and 168, force is applied against the side wall 186 of the spring pin to slightly close the slot 184. This results in the spring pin 144 being effective to apply force against the tubular stem and the stator frame 150 urging the stator frame 150 radially outward away from the tubular stem 108. The resiliently deflectable spring pin 146 is disposed diametrically opposite from the spring pin 144. Radially offsetting forces are applied against the stator frame 150 and the tubular stem 108 by the identical spring pins 144 and 146 to maintain a relatively small circular gap between the cylindrical inner side surface 160 of the stator frame 150 and the cylindrical outer side surface 162 of the tubular stem 108. Therefore, the stator frame 150 does not engage the tubular stem 108.

During operation of the electric motor 34, any vibration forces transmitted from the stator frame 150 to the tubular stem 108 must be transmitted through the resiliently deflectable spring pins 144 and 146. Although there is only a small gap between the cylindrical inner side surface 160 of the stator frame 150 and the cylindrical outer side surface 162 of the tubular stem 108, the stator frame and the tubular stem are maintained in a spaced apart relationship by the spring pins 144 and 146. The spring pins 144 and 146 are, themselves, resiliently deflected to attenuate vibrational forces. This minimizes vibration of the tubular stem 108 during operation of the electric motor 34.

In the illustrated embodiment of the invention, the spring pin 144 has a cylindrical configuration. However, it is contemplated that the spring pin 144 could be provided with a noncircular configuration if desired. For example, the spring pin 144 could be provided with a generally polygonal configuration. If the spring pin 144 is constructed with a polygonal configuration, one corner portion of the spring pin could be placed in the groove 166 in the stator frame 150 and an opposite corner portion of the spring pin placed in the groove 168 in the tubular stem 108. A spring pin having a generally polygonal configuration may or may not have a slot corresponding to the slot 184 in the spring pin 144.

Although only two spring pins 144 and 146 are used in the embodiment of the invention illustrated in FIG. 4, it is contemplated that a greater number of spring pins could be utilized if desired. If more than two spring pins are utilized, it is believed that it may be desired to space the spring pins equal arcuate distances apart about the circular inner and outer side surfaces 160 and 162 of the stator frame 150 and tubular stem 108. For example, if six identical spring pins, having the same construction as the spring pins 144 and 146 are utilized, the spring pins would be disposed in grooves spaced approximately 60 degrees apart about the periphery of the tubular stem 108.

In the embodiment of the spring pins 144 and 146 illustrated in FIGS. 3 and 4, the spring pins have a length which is substantially as great as the axial extent of the stator 100. Thus, the spring pin 144 (FIG. 3) extends between axially opposite end portions of the stator 100. It is contemplated that the spring pin 144 could have a length which is shorter than the illustrated length of the spring pin.

If desired, the spring pin 144 could have a length which is less than half of the axially extent of the stator 100. If the spring pin 144 is formed with an axial length which is less than one-half of the axial extent of the stator 100, a plurality of spring pins may be substituted for the spring pin 144. Thus, a pair of axially spaced apart spring pins could be located in the grooves 166 and 168 adjacent to axially opposite end portions of the stator 100.

The spring pin 144 (FIG. 5) is formed of metal. The spring pin 144 may be formed of stainless steel or a 55Si7 DIN 17222 steel. This specific spring pin 144 may have a nominal diameter of approximately 2.0 millimeters and a wall thickness of approximately 0.2 mm. This particular spring pin may be provided with an overall length of approximately 21 mm.

It should be understood that the foregoing specific dimensions and materials for specific spring pins 144 and 146 have been set forth herein for purposes of clarity of description and not for purposes of limitation of the invention. It is contemplated that the spring pins 144 and 146 could be formed of many different materials and have many different dimensions.

If the wall thickness of the spring pins 144 and 146 is reduced, the stiffness of the spring pins is also be reduced. In order to provide the spring pins 144 and 146 with the necessary vibration isolation characteristics, the length of the thin walled spring pin would be increased. For example, the thickness of the wall of the spring pin could be reduced to 0.15 mm and the length of the spring pin increased to 50 mm. Alternatively, four spring pins could be substituted for the two spring pins 144 and 146. The four spring pins would have a length of approximately 25 mm and a wall thickness of approximately 0.15 mm. Of course, the length and/or wall thickness of the spring pins may be varied as a function of variations in the material forming the spring pins in order to achieve the desired vibration isolation characteristics.

The motor control circuitry 116 is connected with the stator 100 of the electric motor 34 by metal hooks (not shown). The motor control circuitry 116 is also connected with the manifold plate 44. Therefore, vibrations can be transmitted from the electric motor 34 through the motor control circuitry 116 to the manifold plate 44. However, the hooks which connect the motor control circuitry 116 with the stator 100 of the electric motor 34 are formed of sheet metal and are very flexible. Therefore, the vibrational forces which are transmitted from the stator 100 through the metal hooks to the motor control circuitry are very small.

Resiliently Deflectable Members—Second Embodiment

In the embodiment of the invention illustrated in FIGS. 1–6, the resiliently deflectable members 144 and 146 are formed by a tubular body of metal. In the embodiment of the invention illustrated in FIGS. 7 and 8, the resiliently deflectable members are formed by a rolled-up piece of sheet metal. Since the embodiment of the invention illustrated in FIGS. 7 and 8 is generally similar to the embodiment of the invention illustrated in FIGS. 1–6, similar numerals will be utilized to designate similar components, the suffix letter "a" being associated being associated with the numerals of FIGS. 7 and 8 to avoid confusion.

A resiliently deflectable member or spring pin 144a is illustrated in FIGS. 7 and 8. Although only one spring pin 144a is illustrated in FIGS. 7 and 8, it should be understood that a second spring pin, corresponding to the spring 146 of FIG. 4 is provided in association with the spring pin 144a. The second spring pin has the same construction as the spring pin 144a.

The resiliently deflectable spring pin 144a is disposed between a cylindrical inner side surface 160a (FIG. 8) on the frame 150a of the stator 100a and a cylindrical outer side surface 162a on the tubular stem 108a which forms a base for an electric motor. Although the electric motor is not fully illustrated in FIGS. 7 and 8, it should be understood that the electric motor has the same general construction as the electric motor 34 of FIGS. 1–6. It should also be understood that the tubular stem 108a is telescopically received in the stator 100a of an electric motor in the same manner as in which the stem 108 of FIGS. 3 and 4 is received in the stator 100 of the electric motor 34.

The spring pin 144a (FIG. 8) is disposed in linear grooves 166a and 168a formed in the stator frame 150a and tubular stem 108a. The groove 166a is formed by a portion of a cylinder having a larger diameter than the resiliently deflectable spring pin 144a. Thus, the linear groove 166a has a center of curvature which is offset radially inward from a cylindrical inner side surface 160a on the stator frame 150a. By providing the groove 166a with a relatively large diameter, the spring pin 144a has a linear area of contact, which approaches line contact, with the stator frame 150a. The linear area of contact of the spring pin 144a with the linear groove 166a extends parallel to coincident central axes of the stator 100a and tubular stem 108a.

Similarly, the linear groove 168a is formed by a portion of a cylinder having a larger diameter than the diameter of the resiliently deflectable spring pin 144a. Thus, the linear groove 168a has a center of curvature which is offset radially outward from the cylindrical outer side surface 162a of the tubular stem 108a which forms a base for the electric motor. By providing the groove 168a with a relatively large diameter, the spring pin 144a has a linear area of contact, which approaches line contact, with the tubular stem 108a. The linear area of contact of the spring pin 144a with the linear groove 168a extends parallel to the coincident central axes of the stator 100a and tubular stem 108a.

The resiliently deflectable spring pin 144a is hollow and formed by a rolled-up piece 200 (FIG. 7) of sheet metal. In the illustrated embodiment of the invention, the circular turns which form the spring pin 144a are wound in a spiral configuration with adjacent turns disposed in abutting engagement. The abutting circular turns of the spring pin 144a result in the spring pin having a generally cylindrical tubular configuration.

Prior to rolling up of the sheet metal piece 200 (FIG. 7), the piece has a flat rectangular configuration. The sheet metal piece 200 is rolled-up to form the hollow cylindrical spring pin 144a having a plurality of circular turns and a central axis 204. The tubular spring pin 144a has a spiral cross sectional configuration as viewed in a plane extending perpendicular to the axis 204. The spring pin 144a has the same cross sectional configuration and size through out the axial extent of the spring pin.

The spring pin 144a is radially compressed to reduce its outside diameter prior to insertion of the spring pin into the grooves 166a and 168a. The pin 144a is then moved axially into the grooves 166a and 168a. The pin 144a is released and the coiled turns of the pin 144a expand under the influences of their own natural resilience. This presses the outer turn of the metal piece 200 firmly against the linear grooves 166a and 168a.

During operation of the electric motor, corresponding to the electric motor 34 of FIGS. 2 and 3, vibration forces which extend tangentially and radially to the cylindrical inner side surface 160a of the stator frame 150a are isolated by the resiliently deflectable spring pin 144a and the associated identical spring pin corresponding to the spring pin 146 of FIG. 4. Therefore, radially reduced vibrational forces are transmitted between the stator frame 150a (FIG. 8) and the tubular stem 108a which forms the base for the electric motor.

The resiliently deflectable member or spring pin 144a and the associated spring pin having the same construction and corresponding to the spring 146 of FIG. 4, reduce the effective transmission frequency of the structure formed by the stator frame 150a and the tubular stem 108a. By reducing the vibrational force transmitted between the stator frame 150a and the tubular stem 108a during operation of the electric motor, vibration of a manifold plate and sheet metal housing connected with the electric motor tend to be minimized. By minimizing vibration, there is a substantial reduction in the amount of objectionable noise during operation of the electric motor.

In the illustrated embodiment of the resiliently deflectable member or spring pin 144a, the spring pin extends axially through a relatively short portion of the axial extent of the stator frame 150a. Therefore, a plurality of the resiliently deflectable members or spring pins 144a are provided in the linear grooves 166a and 168a (FIG. 8). Thus, two or three of the spring pins 144a are provided in the linear grooves 166a and 168a. However, If desired, the axial extent of the resiliently deflectable member or spring pin 144a could be increased and only a single spring pin provided in each of the grooves 166a and 168a.

During operation of the electric motor and the application of vibration forces to the resiliently deflectable member or spring pin 144a, the circular turns of the spring pin are resiliently deflected. This resilient deflection of the turns of the spring pin 144a may result in a reduction in the outside diameter of the spring pin. At the same time, a radial deflection of the turns of the spring pin 144a may result in ovalizing of the turns. Since there is a relatively small linear area of contact, almost line contact, between the outer side surfaces of the turns of the spring pin 144a with the surfaces of the grooves 166a and 168a, the turns of the spring pin can shift slightly relative to the stator frame 150a and the tubular stem 108a as the spring pin is resiliently deformed by vibrational forces. If desired, very shallow grooves or indentations may be formed in the surfaces of the linear grooves 166a and 168a to hold the spring pin 144a against axial movement.

In the embodiment of the invention illustrated in FIGS. 7 and 8, the spring pin 144a is formed by a rolled-up piece of sheet metal 200. However, it is contemplated that the spring pin 144a could have a different construction if desired. For example, the spring pin could be formed by an elongated rod or wire which is bent to have helical turns.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a base having a tubular section;
   a stator extending around and at least partially enclosing said tubular section of said base;
   a rotor extending around and at least partially enclosing said stator and said tubular section of said base, said rotor being rotatable relative to said stator and said base under the influence of magnetic forces transmitted between said rotor and stator;
   a drive shaft connected with said rotor and extending into said tubular section of said base, said drive shaft being rotatable with said rotor relative to said stator and said base; and
   means for reducing transmission of vibration between said tubular section of said base and said stator;

said means for reducing transmission of vibration includes a plurality of hollow metal members disposed between said tubular section of said base and said stator, said hollow metal members being resiliently deflectable under the influence of vibrations induced in said stator during rotation of said rotor relative to said stator.

2. An apparatus a set forth in claim 1 wherein said hollow metal members have longitudinal central axes which extend parallel to an axis about which said rotor is rotatable relative to said stator, said hollow metal members are resiliently deflectable in a direction transverse to the longitudinal central axes of said hollow metal members to reduce transmission of vibration between said stator and said tubular section of said base.

3. An apparatus as set forth in claim 2 wherein each hollow metal member of said plurality of hollow metal members has first and second end portions and a slot which extends between said first and second end portions, each of said hollow metal members is resiliently deflectable to vary the size of the slot under the influence of force transmitted between said stator and tubular section of said base through each of said hollow metal members during rotation of said rotor relative to said stator.

4. An apparatus as set forth in claim 3 wherein a plurality of parallel grooves are formed in said tubular section of said base, each of said grooves of said plurality of parallel grooves has a longitudinal central axis which extends parallel to the axis about which said rotor is rotatable relative to said base, each of said hollow metal members of said plurality of hollow metal members being at least partially disposed in one of said grooves of said plurality of parallel grooves.

5. An apparatus as set forth in claim 3 wherein a plurality of parallel grooves are formed in said stator, each of said grooves of said plurality of parallel grooves has a longitudinal central axis which extends parallel to the axis about which said rotor is rotatable relative to said base, each of said hollow metal members being at least partially disposed in one of said grooves of said plurality of parallel grooves.

6. An apparatus as set forth in claim 1 wherein each of said hollow metal members has a generally cylindrical configuration.

7. An apparatus as set forth in claim 1 wherein each hollow metal member of said plurality of hollow metal members is formed by a member bent to form a plurality of turns about a longitudinal central axis of said hollow metal member.

8. An apparatus as set forth in claim 1 wherein each one of said hollow metal members of said plurality of hollow metal members is formed of sheet metal which defines a plurality of circular turns having a spiral cross sectional configuration as viewed in a plane extending transverse to a longitudinal central axis of said one hollow metal member.

9. An apparatus as set forth in claim 1 wherein each one of said hollow metal members of said plurality of hollow metal members has a side wall which at least partially defines a slot which extends between opposite end portions of said one hollow metal member and which has a longitudinal central axis which extends parallel to a longitudinal central axis of said one hollow metal member.

10. Apparatus comprising:
a base having a tubular section with a first plurality of longitudinally extending grooves formed in said tubular section of said base with central axes of said first plurality of grooves extending parallel to a central axis of said tubular section of said base, each of said grooves of said first plurality of grooves having a longitudinally extending surface with an arcuate transverse cross sectional configuration;
a stator extending around and at least partially enclosing said tubular section of said base, said stator having a second plurality of longitudinally extending grooves formed therein with central axes of the second plurality of grooves extending parallel to the central axis of said tubular section of said base, each of said grooves of said second plurality of grooves having a longitudinally extending surface with an arcuate transverse cross sectional configuration;
a rotor extending around and at least partially enclosing said stator and said tubular section of said base, said rotor being rotatable relative to said stator and said base under the influence of magnetic forces transmitted between said rotor and said stator;
a drive shaft connected with said rotor and extending into said tubular section of said base, said drive shaft being rotatable with said rotor relative to said stator and said base; and
a plurality of resiliently deflectable members disposed between said tubular section of said base and said stator to reduce vibration between said tubular section of said base and said stator during rotation of said rotor relative to said stator and base;
each resiliently deflectable member of said plurality of resiliently deflectable members having a first longitudinally extending outer side surface area disposed in engagement with the longitudinally extending surface of one of said grooves of said first plurality of grooves formed in said tubular section of said base and a second longitudinally extending outer side surface area disposed in engagement with the longitudinally extending surface of one of said grooves of said second plurality of grooves formed in said stator.

11. An apparatus as set forth in claim 10 wherein each of said resiliently deflectable members is a hollow metal member.

12. An apparatus as set forth in claim 10 wherein said longitudinally extending surface of each groove of said first plurality of grooves has a radius of curvature which is the same as a radius of curvature of said longitudinally extending surface of each groove of said second plurality of grooves.

13. An apparatus as set forth in claim 10 wherein said first longitudinally extending outer side surface area on each of said resiliently deflectable members of said plurality of resiliently deflectable members has a radius of curvature which is less than the radius of curvature of curvature of the longitudinally extending surfaces of said first plurality of grooves formed in said tubular section of said base, said second longitudinally extending outer side surface area on each of said resiliently deflectable members has a radius of curvature which is less than the radius of curvature of the longitudinally extending surfaces of said second plurality of grooves formed on said stator.

14. An apparatus as set forth in claim 10 wherein each of said resiliently deflectable members has a cylindrical tubular configuration.

15. An apparatus as set forth in claim 10 wherein each of said resiliently deflectable members of said plurality of resiliently deflectable members has first and second end portions and a slot which extends between said first and second end portions.

16. An apparatus as set forth in claim 10 wherein each of said resiliently deflectable members is formed of sheet metal rolled up to form a spiral cross sectional configuration.

17. An apparatus as set forth in claim 10 further including electrical circuitry connected with said base, said electrical circuitry having connections with said base which have a stiffness which is substantially less than stiffness of said resiliently deflectable members.

18. An apparatus as set forth in claim 10 wherein each one of said resiliently deflectable members has a side wall which at least partially defines a slot which extends between opposite ends of said one resiliently deflectable member and which has a longitudinal central axis which extends parallel to the central axes of said first and second pluralities of grooves.

19. An apparatus comprising:
   a base having a tubular section;
   a stator extending around and at least partially enclosing said tubular section of said base;
   a rotor extending around and at least partially enclosing said stator and rotatable relative to said stator under the influence of magnetic forces transmitted between said rotor and stator;
   a drive shaft connected with said rotor and extending through said tubular section of said base, said drive shaft being rotatable with said rotor relative to said stator and said base;
   a plurality of resiliently deflectable members disposed between said tubular section of said base and said stator to reduce transmission of vibration between said stator and said tubular section of said base; and
   a pump unit mounted on said base, said drive shaft having a first end portion which is fixedly connected with said rotor, a second end portion which is connected with said pump unit and an intermediate portion which extends between said first and second end portions of said drive shaft and is at least partially disposed in a passage in said tubular section of said base.

20. An apparatus as set forth in claim 19 wherein each resiliently deflectable member of said plurality of resiliently deflectable members is a hollow metal member which is resiliently deflectable under the influence of vibrations induced in said stator during rotation of said rotor relative to said stator.

21. An apparatus as set forth in claim 20 wherein each hollow metal member of said plurality of hollow metal members has first and second end portions and a slot which extends between said first and second end portions, each of said hollow metal members is resiliently deflectable to vary the size of the slot.

22. An apparatus as set forth in claim 20 wherein each hollow metal member of said plurality of hollow metal members is formed of sheet metal rolled up to form a spiral cross sectional configuration.

23. An apparatus as set forth in claim 20 wherein each hollow metal member of said plurality of hollow metal members has a generally cylindrical configuration and has a longitudinal central axis which extends parallel to an axis about which said drive shaft and rotor rotate relative to said stator and said base.

24. An apparatus as set forth in claim 20 wherein a first plurality of grooves are formed in said tubular section of said base and have longitudinal central axes which extend parallel to a central axis of said tubular section of said base, each hollow metal member being at least partially disposed in one of said grooves of said first plurality of grooves.

25. An apparatus as set forth in claim 24 wherein a second plurality of grooves are formed in said stator and have longitudinal central axes which extend parallel to central axes of said grooves of said first plurality of grooves, each hollow metal member being at least partially disposed in one of said grooves of said second plurality of grooves.

26. An apparatus as set forth in claim 25 wherein each hollow metal member of said plurality of hollow metal members has a generally cylindrical configuration and has a longitudinal central axis which extends parallel to longitudinal central axes of said grooves of said first and second plurality of grooves.

27. An apparatus as set forth in claim 19 wherein a first plurality of longitudinally extending grooves are formed in said tubular section of said base with central axes of said first plurality of grooves extending parallel to a central axis of said tubular section of said base, a second plurality of longitudinally extending grooves are formed in said stator with central axes of said second plurality of grooves extending parallel to central axes of said first plurality of grooves, each of said resiliently deflectable members of said plurality of resiliently deflectable members being at least partially disposed in one of said grooves of said first plurality of grooves and one of said grooves of said second plurality of grooves.

28. An apparatus comprising:
   a base having a tubular section with first and second ends and a plate section which is connected with and projects outward from the first end of said tubular section, said tubular section of said base having a first plurality of grooves formed therein with central axes of said first plurality of grooves extending parallel to a central axis of said tubular section of said base;
   a stator extending around and at least partially enclosing a portion of said tubular section of said base, said stator having a second plurality of longitudinally extending grooves formed in said stator and extending parallel to the central axis of said tubular section of said base, each groove of said second plurality of grooves faces toward and is aligned with one of said grooves of said first plurality of grooves;
   a rotor extending around and at least partially enclosing said stator and said tubular section of said base, said rotor being rotatable relative to said stator under the influence of magnetic force transmitted between said rotor and stator;
   a drive shaft connected with said rotor and extending through said first and second ends of said tubular section of said base, said drive shaft being rotatable with said rotor relative to said stator and said base;
   a pump unit disposed adjacent to a side of said plate section of said base opposite from said tubular section of said base, said pump unit being connected with and driven by said drive shaft during rotation of said rotor relative to said stator;
   a motor housing which at least partially encloses said rotor, stator and tubular section of said base, said motor housing being fixedly connected with said plate section of said base;
   a pump housing which at least partially encloses said pump unit and is connected with said plate section of said base; and
   a plurality of resiliently deflectable members disposed between said tubular section of said base and said stator to reduce transmission of vibration from said stator through said tubular section of said base to said pump housing and said motor housing during rotation of said rotor relative to said stator, each of said resiliently deflectable members of said plurality of resiliently deflectable members being partially disposed in one of said grooves of said first plurality of grooves and in one of said grooves of said second plurality of grooves.

29. An apparatus as set forth in claim 28 wherein each resiliently deflectable member of said plurality of resiliently deflectable members is a hollow metal member.

30. An apparatus as set forth in claim 28 wherein each one of said resiliently deflectable members is formed by a member bent to form a plurality of turns about a longitudinal central axis of said one resiliently deflectable member.

31. An apparatus as set forth in claim 28 wherein each one of said resiliently deflectable members of said plurality of resiliently deflectable members is formed of sheet metal which defines a plurality of circular turns having a spiral cross sectional configuration as viewed in a plane extending transverse to a longitudinal central axis of said one resiliently deflectable member.

32. An apparatus as set forth in claim 28 wherein each one of said resiliently deflectable members of said plurality of resiliently deflectable members defines a slot which extend between opposite end portions of said one resiliently deflectable member and which has a longitudinal central axis which extends parallel to a longitudinal central axis of said one resiliently deflectable member.

33. An apparatus as set forth in claim 28 wherein said plate section of said base at least partially defines a first fluid flow path along which a flow of fluid is conducted to said pump unit and a second fluid flow path along which a flow of fluid is conducted from said pump unit.

34. An apparatus as set forth in claim 28 wherein each one of said resiliently deflectable members of said plurality of resiliently deflectable members has a tubular side wall which defines a slot extending between an outer side surface and an inner side surface of said one resiliently deflectable member.

35. An apparatus comprising:
   a base having a tubular section;
   a stator extending around and at least partially enclosing said tubular section of said base;
   a rotor extending around and at least partially enclosing said stator and said tubular section of said base, said rotor being rotatable relative to said stator and said base under the influence of magnetic forces transmitted between said rotor and stator;
   a drive shaft connected with said rotor and extending into said tubular section of said base, said drive shaft being rotatable with said rotor relative to said stator and said base;
   means for reducing transmission of vibration between said tubular section of said base and said stator;
   said means for reducing transmission of vibration includes a plurality of hollow metal members disposed between said tubular section of said base and said stator, said hollow metal members being resiliently deflectable under the influence of vibrations induced in said stator during rotation of said rotor relative to said stator; and
   electrical circuitry connected with said base, said electrical circuitry having connections with said base which have a stiffness which is substantially less than a stiffness of said hollow metal members.

36. An apparatus comprising:
   a base having a tubular section;
   a stator extending around and at least partially enclosing said tubular section of said base;
   a rotor extending around and at least partially enclosing said stator and said tubular section of said base, said rotor being rotatable relative to said stator and said base under the influence of magnetic forces transmitted between said rotor and stator;
   a drive shaft connected with said rotor and extending into said tubular section of said base, said drive shaft being rotatable with said rotor relative to said stator and said base; and
   means for reducing transmission of vibration between said tubular section of said base and said stator;
   said means for reducing transmission of vibration includes a plurality of hollow metal members disposed between said tubular section of said base and said stator, said hollow metal members being resiliently deflectable under the influence of vibrations induced in said stator during rotation of said rotor relative to said stator;
   a plurality of grooves are formed in said base and have longitudinally extending surfaces with arcuate transverse cross sectional configurations and a first radius of curvature, said plurality of hollow metal members having longitudinally extending outer side surface areas which are disposed in engagement with said longitudinally extending surfaces of said grooves, said longitudinally extending outer side surface areas on said plurality of hollow metal members have arcuate transverse cross sectional configurations with a second radius of curvature which is less than said first radius of curvature.

37. An apparatus a set forth in claim 36 wherein said hollow metal members have longitudinal central axes which extend parallel to longitudinal central axes of said grooves, said hollow metal members are resiliently deflectable in a direction transverse to the longitudinal central axes of said hollow metal members to reduce transmission of vibration between said stator and said tubular section of said base.

38. An apparatus as set forth in claim 36 wherein each hollow metal member of said plurality of hollow metal members has first and second end portions and a slot which extends between said first and second end portions, each of said hollow metal members is resiliently deflectable to vary the size of the slot under the influence of force transmitted between said stator and tubular section of said base through each of said hollow metal members during rotation of said rotor relative to said stator.

39. An apparatus as set forth in claim 36 wherein a plurality of parallel grooves are formed in said stator, each of said hollow metal members of said plurality of hollow metal members being at least partially disposed in one of said grooves of said plurality of grooves in said stator.

40. An apparatus as set forth in claim 36 wherein a plurality of grooves are formed in said stator, each of said grooves of said plurality of grooves in said stator and each of said grooves of said plurality of grooves in said base has a longitudinal central axis which extends along to the axis about which said rotor is rotatable relative to said base, each of said hollow metal members being at least partially disposed in one of said grooves of said plurality of grooves in said stator and each of said hollow metal members being at least partially disposed in one of said grooves of said plurality of grooves in said base.

41. An apparatus as set forth in claim 36 wherein each of said hollow metal members has a generally cylindrical configuration.

42. An apparatus as set forth in claim 36 wherein each hollow metal member of said plurality of hollow metal members is formed by a member bent to form a plurality of turns about a longitudinal central axis of said hollow metal member.

43. An apparatus as set forth in claim 36 wherein each one of said hollow metal members of said plurality of hollow metal members is formed of sheet metal which defines a plurality of circular turns having a spiral cross sectional configuration as viewed in a plane extending transverse to a longitudinal central axis of said one hollow metal member.

44. An apparatus as set forth in claim 36 wherein each one of said hollow metal members of said plurality of hollow metal members has a side wall which at least partially defines a slot which extends between opposite end portions of said one hollow metal member.

45. An apparatus as set forth in claim 36 further including electrical circuitry connected with said base, said electrical circuitry having connections with said base which have a stiffness which is substantially less than a stiffness of said hollow metal members.

46. An apparatus comprising:
a base having a tubular section;
a stator extending around and at least partially enclosing said tubular section of said base;
a rotor extending around and at least partially enclosing said stator and said tubular section of said base, said rotor being rotatable relative to said stator and said base under the influence of magnetic forces transmitted between said rotor and stator;
a drive shaft connected with said rotor and extending into said tubular section of said base, said drive shaft being rotatable with said rotor relative to said stator and said base; and
means for reducing transmission of vibration between said tubular section of said base and said stator;
said means for reducing transmission of vibration includes a plurality of hollow metal members disposed between said tubular section of said base and said stator, said hollow metal members being resiliently deflectable under the influence of vibrations induced in said stator during rotation of said rotor relative to said stator;
a plurality of grooves are formed in said stator and have longitudinally extending surfaces with arcuate transverse cross sectional configurations and a first radius of curvature, said plurality of hollow metal members have longitudinally extending outer side surface areas which are disposed in engagement with said longitudinally extending surfaces of said grooves, said longitudinally extending outer side surface areas on said plurality of hollow metal members have arcuate transverse cross sectional configurations with a second radius of curvature which is less than said first radius of curvature.

47. An apparatus a set forth in claim 46 wherein said hollow metal members have longitudinal central axes which extend parallel to longitudinal central axes of said groove, said hollow metal members are resiliently deflectable in a direction transverse to the longitudinal central axes of said hollow metal members to reduce transmission of vibration between said stator and said tubular section of said base.

48. An apparatus as set forth in claim 46 wherein each hollow metal member of said plurality of hollow metal members has first and second end portions and a slot which extends between said first and second end portions, each of said hollow metal members is resiliently deflectable to vary the size of the slot under the influence of force transmitted between said stator and tubular section of said base through each of said hollow metal members during rotation of said rotor relative to said stator.

49. An apparatus as set forth in claim 46 wherein a plurality of grooves are formed in said base, each of said hollow metal members of said plurality of hollow metal members being at least partially disposed in one of said grooves of said plurality of grooves in said base.

50. An apparatus as set forth in claim 46 wherein a plurality of grooves are formed in said base, each of said grooves of said plurality of grooves in said base and each of said grooves of said plurality of grooves in said stator has a longitudinal central axis which extends along to the axis about which said rotor is rotatable relative to said base, each of said hollow metal members being at least partially disposed in one of said grooves of said plurality of grooves in said base and each of said hollow metal members being at least partially disposed in one of said grooves of said plurality of grooves in said stator.

51. An apparatus as set forth in claim 46 wherein each of said hollow metal members has a generally cylindrical configuration.

52. An apparatus as set forth in claim 46 wherein each hollow metal member of said plurality of hollow metal members is formed by a member bent to form a plurality of turns about a longitudinal central axis of said hollow metal member.

53. An apparatus as set forth in claim 46 wherein each one of said hollow metal members of said plurality of hollow metal members is formed of sheet metal which defines a plurality of circular turns having a spiral cross sectional configuration as viewed in a plane extending transverse to a longitudinal central axis of said one hollow metal member.

54. An apparatus as set forth in claim 46 wherein each one of said hollow metal members of said plurality of hollow metal members has a side wall which at least partially defines a slot which extends between opposite end portions of said one hollow metal member.

55. An apparatus as set forth in claim 46 further including electrical circuitry connected with said base, said electrical circuitry having connections with said base which have a stiffness which is substantially less than a stiffness of said hollow metal members.

56. An apparatus comprising:
a base having a tubular;
a stator extending around and at least partially enclosing said tubular section of said base;
a rotor extending around and at least partially enclosing said stator and said tubular section of said base, said rotor being rotatable relative to said stator and said base under the influence of magnetic forces transmitted between said rotor and stator;
a drive shaft connected with said rotor and extending into said tubular section of said base, said drive shaft being rotatable with said rotor relative to said stator and said base; and
means for reducing transmission of vibration between said tubular section of said base and said stator;
said means for reducing transmission of vibration includes a plurality of hollow metal members disposed between said tubular section of said base and said sector, said hollow metal members being resiliently deflectable under the influence of vibrations induced in said stator during rotation of said rotor relative to said stator;
a first plurality of grooves are formed in said base and have longitudinally extending surfaces with arcuate transverse cross sectional configuration and a first radius of curvature, a second plurality of grooves are formed in said stator and have longitudinally extending surfaces with arcuate transverse cross sectional configuration and a second radius of curvature, said first plurality of grooves formed in said stator, said plurality of hollow metal members have first longitudially extending outer side surface areas which are disposed in engagement with said longitudinally extending surfaces of said first plurality of grooves formed in said base and have second longitudinally extending outer side surface areas which are disposed in engagement with said longitudinally extending surfaces of said second plurality of grooves formed in said stator, said first longitudinally extending outer side surface areas on said plurality of hollow metal members have arcuate transverse cross sectional configuration with a third radius of curvature which is less than said first radius of curvature, said second longitudinally extending outer side surface areas on said plurality of hollow metal members have arcuate transverse cross sectional configuration with a fourth radius of curvature which is less than said second radius of curvature.

57. An apparatus as set forth in claim 56, wherein said first radius of curvature is equal to said second radius of curvature and said third radius of curvature is equal to aid fourth radius of curvature.

58. An apparatus as set forth in claim 56 wherein each one of said hollow metal members of said plurality of hollow metal members has a generally C-shaped cross sectional configuration with a slot extending between opposite ends of said one hollow metal member.

59. An apparatus as set forth in claim 56 wherein each of said hollow metal members is formed of sheet metal rolled up to form a spiral cress sectional configuration.

60. An apparatus as set forth in claim 56 wherein each of said grooves of said first plurality of grooves and each of said grooves of said second plurality of grooves has a longitudinal central axis which extends parallel to an axis of rotation of said rotor relative to said stator.

61. An apparatus comprising:

a base having a tubular section;

a stator extending around and at least partially enclosing said tubular section of said base;

a rotor extending around and at least partially enclosing said stator and rotatable relative to said stator under the influence of magnetic forces transmitted between said rotor and stator;

a drive shaft connected with said rotor and extending through said tubular section of said base, said drive shaft being rotatable with said rotor relative to said stator and said base;

a plurality of resiliently deflectable members disposed between said tubular section of said base and said stator to reduce transmission of vibration between said stator and said tubular section of said base;

a pump unit mounted on said base, said drive shaft having a first end portion which is fixedly connected with said rotor, a second end portion which is connected with said pump unit and an intermediate portion which extends between said first and second end portions of said drive shaft and is at least partially disposed in a passage in said tubular section of said base;

each resiliently deflectable member of said plurality of resiliently deflectable members is a hollow metal member which is resiliently deflectable under the influence of vibrations induced in said stator during rotation of said rotor relative to said stator;

each hollow metal member of said plurality of hollow metal members has a generally cylindrical configuration and has a longitudinal central axis which extends parallel to an axis about which said drive shaft and rotor rotate relative to said stator and said base; and electrical circuitry connected with said base, said electrical circuitry having connections with said base which have stiffness which is substantially less than a stiffness of said resiliently deflectable members.

62. An apparatus comprising:

a base having a tubular section;

a stator extending around and at least partially enclosing said tubular section of said base;

a rotor extending around and at least partially enclosing said stator and rotatable relative to said stator under the influence of magnetic forces transmitted between said rotor and stator;

a drive shaft connected with said rotor and extending through said tubular section of said base, said drive shaft being rotatable with said rotor relative to said stator and said base;

a plurality of resiliently deflectable members disposed between said tubular section of said base and said stator to reduce transmission of vibration between said stator and said tubular section of said base; and a pump unit mounted on said base, said drive shaft having a first end portion which is fixedly connected with said rotor, a second end portion which is connected with said pump unit and an intermediate portion which extends between said first and second end portions of said drive shaft and is at least partially disposed in a passage in said tubular section of said base;

a first plurality of longitudinally extending grooves are formed in said tubular section of said base with central axes of said first plurality of grooves extending parallel to a central axis of said tubular section of said base, a second plurality of longitudinally extending grooves are formed in said stator with central axes of said second plurality of grooves extending parallel to central axes of said first plurality of grooves, each of said resiliently deflectable members of said plurality of resiliently deflectable members being at least partially disposed in one of said grooves of said first plurality of grooves and one of said grooves of said second plurality of grooves;

each of said resiliently deflectable members of said plurality of resiliently deflectable members has a generally cylindrical configuration with a first radius, each of said grooves of said first plurality of grooves having a longitudinally extending arcuate surface with a radius of curvature which is grater than said first radius, each of said grooves of said second plurality of grooves having a longitudinally extending arcuate surface with a radius of curvature which is grater than said first radius.

63. An apparatus as set forth in claim 62 wherein each one of said resiliently deflectable members defines a slot which extends between opposite end portions of said one resiliently deflectable member.

64. An apparatus as set forth in claim 62 wherein each of said resiliently deflectable members is formed of sheet metal rolled up to form a spiral cross sectional configuration.

65. An apparatus comprising:

a base having a tubular section with first and second ends and a plate section which is connected with and projects outward from the first end of said tubular section, said tubular section of said base having a first plurality of grooves formed therein with central axes of said first plurality of grooves extending parallel to a central axis of said tubular section of said base;

a stator extending around and at least partially enclosing a portion of said tubular section of said base, said stator having a second plurality of longitudinally extending grooves formed in said stator and extending parallel to the central axis of said tubular section of said base, each groove of said second plurality of grooves faces toward and is aligned with one of said grooves of said first plurality of grooves;

a rotor extending around and at least partially enclosing said stator and said tubular section of said base, said rotor being rotatable relative to said stator under the influence of magnetic force transmitted between said rotor and stator;

a drive shaft connected with said rotor and extending through said first and second ends of said tubular section of said base, said drive shaft being rotatable with said rotor relative to said stator and said base;

a pump unit disposed adjacent to a side of said plate section of said base opposite from said tubular section of said base, said pump unit being connected with and driven by said drive shaft during rotation of said rotor relative to said stator;

a motor housing which at least partially encloses said rotor, stator and tubular section of said base, said motor housing being fixedly connected with said plate section of said base;

a pump housing which at least partially encloses said pump unit and is connected with said plate section of said base; and a plurality of resiliently deflectable members disposed between said tubular section of said base and said stator to reduce transmission of vibration from said stator through said tubular section of said base to said pump housing and said motor housing during rotation of said rotor relative to said stator, each of said resiliently deflectable members of said plurality of resiliently deflectable members being partially disposed in one of said grooves of said first plurality of grooves and in one of said grooves of said second plurality of grooves;

each of said resiliently deflectable members of said plurality of resiliently deflectable members has a longitudinally extending arcuate outer side surface with a radius of a first magnitude, each of said grooves of said first plurality of grooves has a longitudinally extending surface with an arcuate configuration and a radius of a second magnitude which is greater than said first magnitude, each of said grooves of said second plurality of grooves has a longitudinally extending surface with an arcuate configuration and a radius of a third magnitude which is greater than said first magnitude, said longitudinally extending arcuate side surfaces of said resiliently deflectable members being disposed in engagement with said longitudinally extending arcuate side surfaces of said grooves of said first plurality of grooves and said grooves of said second plurality of grooves.

66. An apparatus as set forth in claim 65 wherein each resiliently deflectable member of said plurality of resiliently deflectable members is a hollow metal member.

67. An apparatus as set forth in claim 65 wherein each one of said resiliently deflectable members is formed by a member bent to form a plurality of turns about a longitudinal central axis of said one resiliently deflectable member.

68. An apparatus as set forth in claim 65 wherein each one of said resiliently deflectable members of said plurality of resiliently deflectable members is formed of sheet metal which defines a plurality of circular turns having a spiral cross sectional configuration as viewed in a plane extending transverse to a longitudinal central axis of said one resiliently deflectable member.

69. An apparatus as set forth in claim 65 wherein each one of said resiliently deflectable members of said plurality of resiliently deflectable members defines a slot which extend between opposite end portions of said one resiliently deflectable member and which has a longitudinal central axis which extends parallel to a longitudinal central axis of said one resiliently deflectable member.

70. An apparatus as set forth in claim 65 further including electrical circuitry connected with said base, said electrical circuitry having connections with said base which have a stiffness which is substantially less than a stiffness of said resiliently deflectable members.

71. An apparatus as set forth in claim 65 wherein said plate section of said base at least partially defines a first fluid flow path along which a flow of fluid is conducted to said pump unit and a second fluid flow path along which a flow of fluid is conducted from said pump unit.

72. An apparatus as set forth in claim 65 wherein each one of said resiliently deflectable members of said plurality of resiliently deflectable members has a tubular side wall which defines a slot extending between an outer said surface and an inner side surface of said one resiliently deflectable member.

73. An apparatus comprising:

a base having a tubular section with first and second ends and a plate section which is connected with and projects outward from the first end of said tubular section, said tubular section of said base having a first plurality of grooves formed therein with central axes of said first plurality of grooves extending parallel to a central axis of said tubular section of said base;

a stator extending around and at least partially enclosing a portion of said tubular section of said base, said stator having a second plurality of longitudinally extending grooves formed in said stator and extending parallel to the central axis of said tubular section of said base, each groove of said second plurality of grooves faces toward and is aligned with one of said grooves of said first plurality of grooves;

a rotor extending around and at least partially enclosing said stator and said tubular section of said base, said rotor being rotatable relative to said stator under the influence of magnetic force transmitted between said rotor and stator;

a drive shaft connected with said rotor and extending through said first and second ends of said tubular section of said base, said drive shaft being rotatable with said rotor relative to said stator and said base;

a pump unit disposed adjacent to a side of said plate section of said base opposite from said tubular section of said base, said pump unit being connected with and driven by said drive shaft during rotation of said rotor relative to said stator;

a motor housing which at least partially encloses said rotor, stator and tubular section of said base, said motor housing being fixedly connected with said plate section of said base;

a pump housing which at least partially encloses said pump unit and is connected with said plate section of said base;

a plurality of resiliently deflectable members disposed between said tubular section of said base and said stator to reduce transmission of vibration from said stator through said tubular section of said base to said pump housing and said motor housing during rotation of said rotor relative to said stator, each of said resiliently deflectable members of said plurality of resiliently deflectable members being partially disposed in one of said grooves of said first plurality of grooves and in one of said grooves of said second plurality of grooves; and electrical circuitry connected with said base, said electrical circuitry having connections with said base which have a stiffness which is substantially less than a stiffness of said resiliently deflectable members.

74. An apparatus comprising:

a base having a tubular section;

a stator having a frame member extending around and at least partially enclosing said tubular section of said base, said frame member being disposed in a spaced apart relationship with said tubular section of said base;

a rotor extending around and at least partially enclosing said stator and said tubular section of said base, said rotor being rotatable relative to said stator and said base under the influence of magnetic forces transmitted between said rotor and stator, said stator being at least partially disposed between said rotor and said tubular section of said base;

a drive shaft connected with said rotor and extending into said tubular section of said base, said drive shaft being rotatable with said rotor relative to said stator and said base; and means for supporting said frame member in a spaced apart relationship with said tubular section of said base and for reducing transmission of vibration between said tubular section of said base and said frame member;

said means for supporting said frame member and for reducing transmission of vibration includes a plurality of hollow metal members disposed between and in engagement with said tubular section of said base and said frame member, said hollow metal members being resiliently deflectable under the influence of vibrations induced in said stator during rotation of said rotor relative to said stator.

75. An apparatus a set forth in claim 74 wherein said hollow metal members have longitudinal central axes which extend parallel to an axis about which said rotor is rotatable relative to said stator, said hollow metal members are resiliently deflectable in a direction transverse to the longitudinal central axes of said hollow metal members to reduce transmission of vibration between said stator and said tubular section of said base, said hollow metal members are enclosed by said rotor.

76. An apparatus as set forth in claim 74 wherein said frame member is formed as one piece and has a cylindrical opening into which said tubular section of said base extends, each hollow metal member of said plurality of hollow metal members has first and second end portions and a slot which extends between said first and second end portions, each of said hollow metal members is resiliently deflectable to vary the size of the slot under the influence of force transmitted between said one piece frame member and said tubular section of said base through each of said hollow metal members during rotation of said rotor relative to said stator, each of said hollow metal members being disposed in engagement with said one piece frame member and said tubular section of said base.

77. An apparatus as set forth in claim 74 wherein a plurality of grooves are formed in said tubular section of said base, each of said hollow metal members of said plurality of hollow metal members being at least partially disposed in engagement with a surface of one of said grooves of said plurality of grooves and in engagement with said frame member at a location outside of said one of said grooves of said plurality of grooves.

78. An apparatus as set forth in claim 74 wherein a plurality of grooves are formed in said frame member, each of said hollow metal members of said plurality of hollow metal members being at least partially disposed in engagement with a surface of one of said grooves of said plurality of grooves and in engagement with said tubular section of said base at a location outside of said one of said grooves of said plurality of grooves.

79. An apparatus as set forth in claim 74 wherein each of said hollow metal members has a generally cylindrical configuration.

80. An apparatus as set forth in claim 74 wherein each hollow metal member of said plurality of hollow metal members is formed by a member bent to form a plurality of turns about a longitudinal central axis of said hollow metal member.

81. An apparatus as set forth in claim 74 wherein each one of said hollow metal members of said plurality of hollow metal members is formed of sheet metal which defines a plurality of circular turns having a spiral cross sectional configuration as viewed in a plane extending transverse to a longitudinal central axis of said one hollow metal member.

82. An apparatus as set forth in claim 74 wherein each one of said hollow metal members of said plurality of hollow metal members has a side wall which at least partially defines a slot which extends between opposite end portions of said one hollow metal member and which has a longitudinal central axis which extends parallel to a longitudinal central axis of said one hollow metal member.

83. An apparatus as set forth in claim 74 further including electrical circuitry connected with said base, said electrical circuitry having connections with said base which have a stiffness which is substantially less than a stiffness of said hollow metal members.

84. An apparatus as set forth in claim 74 wherein a plurality of grooves are formed in said tubular section of said base and have longitudinally extending surfaces with arcuate transverse cross sectional configurations, said plurality of hollow metal members having longitudinally extending outer side surface areas which have arcuate transverse cross sectional configurations and are disposed in engagement with said longitudinally extending surfaces of said grooves, said longitudinally extending outer side surface areas on said plurality of hollow metal members are disposed in engagement with said frame member at locations outside of said grooves in said tubular section of said base.

85. An apparatus as set forth in claim 74 wherein a plurality of grooves are formed in said frame member and have longitudinally extending surfaces with arcuate transverse cross sectional configurations, said plurality of hollow metal members have longitudinally extending outer side surface areas which have arcuate transverse cross sectional configurations and are disposed in engagement with said longitudinally extending surfaces of said grooves, said longitudinally extending outer side surface areas on said plurality of hollow metal members are disposed in engagement with said tubular section of said base at locations outside of said grooves in said frame member.

86. An apparatus as set forth in claim 74 wherein a first plurality of grooves are formed in said tubular section of said base and have longitudinally extending surfaces with arcuate transverse cross sectional configurations, a second plurality of grooves are formed in said frame member and have longitudinally extending surfaces with arcuate transverse cross sectional configurations, said first plurality of grooves in said tubular section of said base being axially aligned with said second plurality of grooves formed in said frame member, said plurality of hollow metal members have first longitudinally extending outer side surface areas which are disposed in engagement with said longitudinally extending surfaces of said first plurality of grooves formed in said tubular section of said base and have second longitudinally extending outer side surface areas which are disposed in engagement with said longitudinally extending surfaces of said second plurality of grooves formed in said frame member.

87. An apparatus as set forth in claim 86 wherein each one of said hollow metal members of said plurality of hollow metal members has a generally C-shaped cross sectional configuration with a slot extending between opposite ends of said one hollow metal member.

88. An apparatus as set forth in claim 86 wherein each of said hollow metal members is formed of sheet metal rolled up to form a spiral cross sectional configuration.

89. An apparatus as set forth in claim 86 wherein each of said grooves of said first plurality of grooves and each of said grooves of said second plurality of grooves has a longitudinal central axis which extends parallel to an axis of rotation of said rotor relative to said stator.

90. Apparatus comprising:
  a base having a tubular section with a first plurality of longitudinally extending grooves formed in said tubular section of said base, each of said grooves of said first plurality of grooves having a longitudinally extending surface with an arcuate transverse cross sectional configuration;
  a stator extending around and at least partially enclosing said tubular section of said base, said stator being spaced apart from said tubular section of said base and having a second plurality of longitudinally extending grooves formed therein, each of said grooves of said second plurality of grooves having a longitudinally extending surface with an arcuate transverse cross sectional configuration;
  a rotor extending around and at least partially enclosing said stator and said tubular section of said base, said rotor being rotatable relative to said stator and said base under the influence of magnetic forces transmitted between said rotor and said stator, said stator being at least partially disposed between said rotor and said tubular section of said base;
  a drive shaft connected with said rotor and extending into said tubular section of said base, said drive shaft being rotatable with said rotor relative to said stator and said base; and
  a plurality of resiliently deflectable members disposed between said tubular section of said base and said stator to support said stator in a spaced apart relationship with said tubular section of said base and to reduce vibration between said tubular section of said base and said stator during rotation of said rotor relative to said stator and base;
  each resiliently deflectable member of said plurality of resiliently deflectable members having a first longitudinally extending arcuate outer side surface area disposed in engagement with the longitudinally extending surface of one of said grooves of said first plurality of grooves formed in said tubular section of said base at a location outside of said grooves of said second plurality of grooves formed in said stator;
  each resiliently deflectable member of said plurality of resiliently deflectable members having a second longitudinally extending arcuate outer side surface area disposed in engagement with the longitudinally extending surface of one of said grooves of said second plurality of grooves formed in said stator at a location outside of said grooves of said first plurality of grooves formed in said tubular section of said base.

91. An apparatus as set forth in claim 90 wherein each of said resiliently deflectable members is a hollow metal member.

92. An apparatus as set forth in claim 90 wherein said longitudinally extending surface of each groove of said first plurality of grooves has a radius of curvature which is the same as a radius of curvature of said longitudinally extending surface of each groove of said second plurality of grooves.

93. An apparatus as set forth in claim 90 wherein said first longitudinally extending arcuate outer side surface area on each of said resiliently deflectable members of said plurality of resiliently deflectable members has a radius of curvature which is less than the radius of curvature of curvature of the longitudinally extending surfaces of said first plurality of grooves formed in said tubular section of said base, said second longitudinally extending arcuate outer side surface area on each of said resiliently deflectable members has a radius of curvature which is less than the radius of curvature of the longitudinally extending surfaces of said second plurality of grooves formed on said stator.

94. An apparatus as set forth in claim 90 wherein each of said resiliently deflectable members has a cylindrical tubular configuration.

95. An apparatus as set forth in claim 90 wherein each of said resiliently deflectable members of said plurality of resiliently deflectable members has first and second end portions and a slot which extends between said first and second end portions.

96. An apparatus as set forth in claim 90 wherein each of said resiliently deflectable members is formed of sheet metal rolled up to form a spiral cross sectional configuration.

97. An apparatus as set forth in claim 90 further including electrical circuitry connected with said base, said electrical circuitry having connections with said base which have a stiffness which is substantially less than stiffness of said resiliently deflectable members.

98. An apparatus as set forth in claim 90 wherein each one of said resiliently deflectable members has a side wall which at least partially defines a slot which extends between opposite ends of said one resiliently deflectable member and which has a longitudinal central axis which extends parallel to the central axes of said first and second pluralities of grooves.

* * * * *

UNITED STATES PATENT AND TRADEMARK OFFICE
CERTIFICATE OF CORRECTION

PATENT NO. : 6,281,607 B1
DATED : August 28, 2002
INVENTOR(S) : Michael B. Petach et al.

It is certified that error appears in the above-identified patent and that said Letters Patent is hereby corrected as shown below:

<u>Column 19,</u>
Line 1, before "and" change "figuration" to -- figurations --.
Line 2, after "grooves" insert -- in said base being axially aligned with second plurality of grooves --.
Line 13, after "sectional" change "configuration" to -- configurations --.
Line 22, after "to" change "aid" to -- said --.

Signed and Sealed this

Eighth Day of April, 2003

JAMES E. ROGAN
*Director of the United States Patent and Trademark Office*